US006718685B2

(12) United States Patent
Bossler (10) Patent No.: US 6,718,685 B2
(45) Date of Patent: Apr. 13, 2004

(54) INSECT TRAP APPARATUS (75) Inventor: Martin C. Bossler, Spring Grove, IL (US)

(73) Assignee: CPD Associates, Inc., Winston-Salem, NC (US)

( * ) Notice: Subject to any disclaimer, the term of this patent is extended or adjusted under 35 U.S.C. 154(b) by 0 days.

(21) Appl. No.: 10/141,257

(22) Filed: May 8, 2002

(65) Prior Publication Data

US 2003/0208951 A1 Nov. 13, 2003

(51) Int. Cl.$^7$ ............................................... A01M 1/06
(52) U.S. Cl. .............................. 43/107; 43/139; 43/113
(58) Field of Search ............................ 43/107, 113, 139

(56) References Cited

U.S. PATENT DOCUMENTS

| | | |
|---|---|---|
| 923,368 A | 6/1909 | Myser |
| 1,693,368 A | 11/1928 | Cherry |
| 2,879,620 A | 3/1959 | McGinnis |
| 2,893,161 A | 7/1959 | Reid |
| 3,196,577 A | 7/1965 | Plunkett |
| 4,411,094 A | 10/1983 | Spackova et al. |
| 4,506,473 A | 3/1985 | Waters, Jr. |
| 4,519,776 A | 5/1985 | DeYoreo et al. |
| 4,608,774 A | 9/1986 | Sherman |
| 4,625,453 A | 12/1986 | Smith |
| 4,785,573 A | 11/1988 | Millard |
| 5,040,326 A | 8/1991 | Van Dijnsen et al. |
| 5,157,865 A | 10/1992 | Chang |
| 5,167,090 A | 12/1992 | Cody |

(List continued on next page.)

FOREIGN PATENT DOCUMENTS

| | | |
|---|---|---|
| JP | 01-014128 | 4/1989 |
| JP | 02-063679 | 5/1990 |

OTHER PUBLICATIONS

Indian Journal of Experimental Biology, vol. 32, May 1994, pp. 348–350, "Biting Behaviour of Armigeres Subabaltus (Coquillett) with Reference to Host Selection and Landing", S.D. Srinivas, R. Selvaraj Pandian & S.K. Dwarakanath, Received Oct. 18, 1993.

Journal of American Mosquito Capitol Association, 11(1):6–10, 1995, "Dependence of $CO_2$–Baited Suction Trap Captures on Temperature Variations", D. Petric; M. Zgomba; M. Ludwig and N. Becker.

Anthony W.A. Brown, PhD, "The Attraction of Mosquitoes to Hosts," JAMA, Apr. 18, 1996, vol. 196, No. 3, p. 159.

The Lancet, "Of Bites and Body Odour," Jay S. Keystone, vol. 347, p. 1423, May 25, 1996.

Flower & Garden Magazine, "Protecting Yourself from Pests in the Garden," Jesse Eisenstein, Mar.–Apr. 1997, v41, n2, p. 14(1).

http://www.nomorebites.com/faq.html, "Bug FAQ's Most People Don't Know,"ppgs. 1–12, Jun. 11, 2001.

D.G. Peterson and A. W. A. Brown, "Studies of the Responses of the Female Aedes Mosquito, Part III. The Response of the *Aedes aegypti* (L.) to a Warm Body and its Radiation," Biting Insect Technology, pp. 535–541 (1951).

(List continued on next page.)

*Primary Examiner*—Charles T. Jordan
*Assistant Examiner*—Bret Hayes
(74) *Attorney, Agent, or Firm*—Greer, Burns & Crain, Ltd.

(57) ABSTRACT

An insect trap apparatus includes a trap housing having at least one inlet and at least one outlet. A source of suction is located within the housing and is in fluid communication with the inlet for drawing insects through the inlet. Carbon dioxide gas is disposed in the housing and includes a combustion chamber with a chamber outlet. An exhaust system is connected to the $CO_2$ gas source for directing a flow of $CO_2$ from the gas source to the at least one outlet. Insects are caught in a trap cup that is connected to the housing and disposed between the inlet and the source of suction.

20 Claims, 7 Drawing Sheets

U.S. PATENT DOCUMENTS

| | | | |
|---|---|---|---|
| 5,189,830 | A | 3/1993 | Montemurro |
| 5,205,064 | A | 4/1993 | Nolen |
| 5,205,065 | A | 4/1993 | Wilson et al. |
| 5,255,468 | A | 10/1993 | Cheshire, Jr. |
| 5,301,458 | A | 4/1994 | Deyoreo et al. |
| 5,311,697 | A | 5/1994 | Cavanaugh et al. |
| 5,329,725 | A | 7/1994 | Bible |
| 5,369,909 | A | 12/1994 | Murphy |
| 5,382,422 | A | 1/1995 | Dieguez et al. |
| 5,417,009 | A | 5/1995 | Butler et al. |
| 5,595,018 | A | 1/1997 | Wilbanks |
| 5,647,164 | A | 7/1997 | Yates |
| 5,651,211 | A | 7/1997 | Regan et al. |
| 5,657,576 | A | 8/1997 | Nicosia |
| 5,669,176 | A | 9/1997 | Miller |
| 5,813,166 | A | 9/1998 | Wigton et al. |
| 6,145,243 | A | 11/2000 | Wigton et al. |
| 6,286,249 | B1 | 9/2001 | Miller et al. |
| 2002/0129540 | A1 | 9/2002 | Chura |

OTHER PUBLICATIONS

R.R. Carestia and L.B. Savage, "Effectiveness of Carbon Dioxide as a Mosquito Attractant in the CDC Miniature Light Trap," J. American Mosquito Control Assn., vol. 27, No. 1, pp. 90–92 (Mar. 1967).

M.W. Service, "Mosquito Ecology Field Sampling Methods," Ch. 5, "Sampling Adults by Animal Bait Catches and by Animal–Baited Traps," pp. 349–498 ($2^{nd}$ Ed. 1995).

M.W. Service, "Mosquito Ecology Field Sampling Methods," Ch. 6, Sampling Adults with Carbon Dioxide Traps, Light Traps, Visual Attraction Traps and Sound Traps, pp. 499–610 ($2^{nd}$ Ed. 1995).

T.G. Floore, A.H. Boike, Jr., C.B. Rathburn, Jr., L.A. Sizemore and K.L. King, "Mosquito Trapping Studies to Determine the Efficacy of Two Models of the Flowtron® Mosquito Luring Device," J. Florida Anti–Mosquito Association. Vol. 56, No. 1, pp. 13–17 (1985).

"Setting the Standard in Dipteran Collection Equipment," American Biophysics Corporation, pp. 1–16.

Owner's Manual, BugVac™ Model 1101, "Electronic Insect Killer."

Daniel L. Kline, "Comparison of Two American Biophysics Mosquito Traps: The Professional and a New Counterflow Geometry Trap," J. American Mosquito Control Assn., vol. 15, No. 3, pp. 276–282 (1999).

Douglas A. Burkett, Won J. Lee, Kwan W. Lee, Heung C. Kim, Hee I. Lee, Jong S. Lee, E.H. Shin, Robert A. Wirtz, Hae W. Cho, David M. Claborn, Russell E. Coleman, and Terry A. Klein, "Light, Carbon Dioxide, and Octenol–Baited Mosquito Trap and Host–Seeking Activity Evaluations for Mosquitoes in a Malarious Area of the Republic of Korea," J. American Mosquito Control Assn., vol. 17, No. 3, pp. 196–205 (2001).

INSECT TRAP APPARATUS

BACKGROUND OF THE INVENTION

This invention relates to an insect trap. More specifically, it relates to a trap that uses suction to draw insects into the trap.

Suction-type insect traps are well known in the art. A suction source, such as a fan, is used to draw large amounts of air through a trap, snaring any insects that are entrained in the air flow. However, without an effective system for attracting insects to the trap, only an unlucky few insects that happen to be within range of the suction source will be caught by the trap. The prior art teaches the use of heat, water vapor and carbon dioxide as insect lures, as these are all present in the breath and sweat of warm-blooded animals. Octanol is also known as a chemical insect attractant. It is believed that the temperature of the exhaust stream is important, and should be above ambient temperature but not exceed 115° F.

Effective prior art suction traps use a combination of suction, heat, water vapor and chemical attractants to lure insects, especially mosquitoes, to the trap. A suction inlet surrounds an outlet stream containing the various attractants. Insects follow the attractant plume to the trap, and are drawn into a long suction tube that surrounds an exhaust tube. Once inside the trap, the insects are caught in a net located under the combustion unit. Exhaust from the combustion unit supplies the heat, carbon dioxide and water vapor to the air, which is then exhausted from the unit through the exhaust tube. A tiny cartridge inside the exhaust tube holds supplemental chemical attractants.

Counter-current air flow of the exhaust within the intake air poses several design problems. There is limited space over the length of the counter flow to deposit and hold the insects. The trap area is often located under the combustion engine. To empty the trap, or check how full it is, the user must inconveniently open the housing and move the engine platform aside. After emptying the trap, the engine is returned to its original position and the housing closed before normal operation is resumed.

An additional problem with the air flow arrangement in the known trap is the limited number of locations on the device that supplemental chemical attractants can be positioned. Attractants are available in a number of different forms, sizes and strengths. However, the limited amount of space within the exhaust tube limits the user to the form or strength dictated by the size of the chemical receptacle.

Counter-current flow is very efficient at transferring heat between two streams, but this can also be a disadvantage at times. The intake air is always at ambient temperature, while the exhaust stream is always warmer than ambient, providing heat transfer from the exhaust tube to the intake air. Because the heat content of the two streams is interrelated, it may be more difficult to control the exhaust temperature. For example, on a hot day, there may be insufficient heat transfer from the exhaust to the intake stream to cool the exhaust stream to below 115° F.

The air flow pattern of the known design also makes it more costly to manufacture due to the number of parts that have to be separately molded and assembled. This means that many molds have to be made, additional labor is needed to make and assemble the parts and additional warehouse space is needed to store the additional parts until the insect trap is assembled. If the engine is designed to be moveable, additional parts are needed compared to a stationary engine.

There is a need in the art for an effective insect trap that is more convenient for the user, yet is reasonably priced. There is also a need for an insect trap which addresses the air flow issues discussed above.

SUMMARY OF THE INVENTION

The insect trap of the present invention has an improved air flow pattern. Emptying insects from the unit is easy and convenient for the user. Multiple sizes or types of chemical attractant can be used in the unit, and are conveniently placed. Even with these advantages, the present trap uses relatively few molded parts and requires little assembly, resulting in a trap that is reasonably priced.

More specifically, the present insect trap apparatus includes a trap housing having at least one inlet and at least one outlet. A source of suction is located within the housing and is in fluid communication with the inlet for drawing insects through the inlet. Carbon dioxide gas is disposed in the housing and includes a combustion chamber with a chamber outlet. An exhaust system is connected to the $CO_2$ gas source for directing a flow of $CO_2$ from the gas source to the at least one outlet. Insects are caught in a trap cup that is connected to the housing and disposed between the inlet and the source of suction.

Air flow through this insect trap overcomes many of the disadvantages of the prior art. Without the limitations of counter flow between the intake air and the exhaust, the air flow can be directed through areas of the trap so that insects can be trapped where they are conveniently accessed by the user for disposal. Versatility in air flow also allows receptacles for supplemental attractants to be conveniently placed in areas where there is space for multiple receptacles to accommodate a variety of attractant sizes or types.

Without heat exchange between the intake air and the exhaust, independent control of the two fluid streams makes it easier to control the temperature of the exhaust gas outflow. Although the temperatures of all of the fluid streams will vary with the temperature of the ambient air, temperature is expected to be more easily controlled where there are fewer opportunities to transfer heat.

The structure of the present insect trap also makes it more economical to manufacture. Conduits for fluid transfer are molded into other structural elements, providing fewer parts that need to be molded, stored and assembled. Less labor can be used since fewer parts are made and assembled. The cost of making the molds is reduced. Thus, the present insect trap can be more efficiently made, resulting in savings to both the manufacturer and the consumer.

DETAILED DESCRIPTION OF THE DRAWINGS

DETAILED DESCRIPTION OF THE INVENTION

Figure 1:
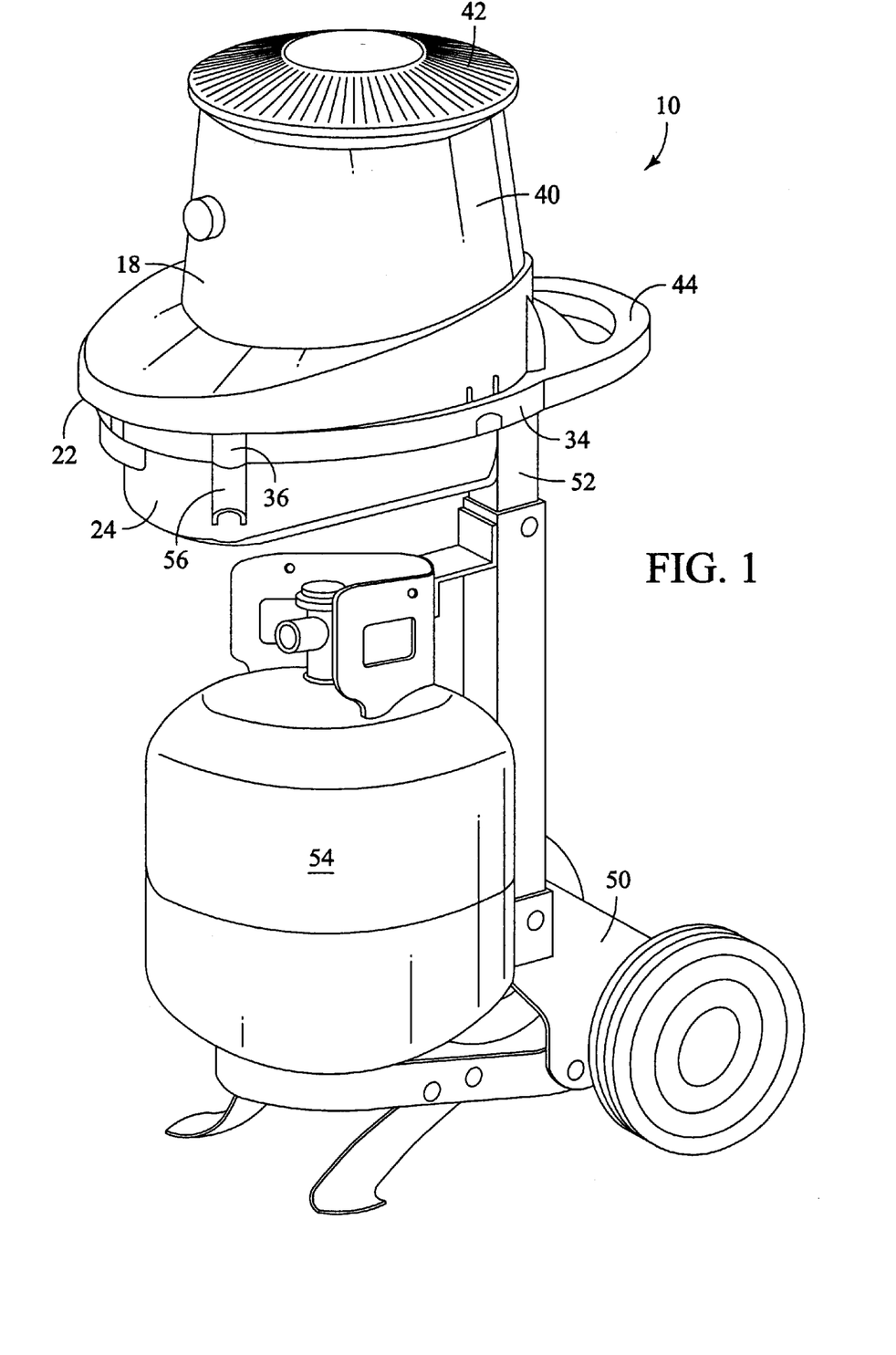
FIG. 1 is a perspective view of one embodiment of the insect trap mounted to a cart.

An insect trap, generally designated 10, is shown in FIG. 1. Directional references to the trap or any parts thereof refer to the trap as oriented in FIG. 1.

Figure 5:
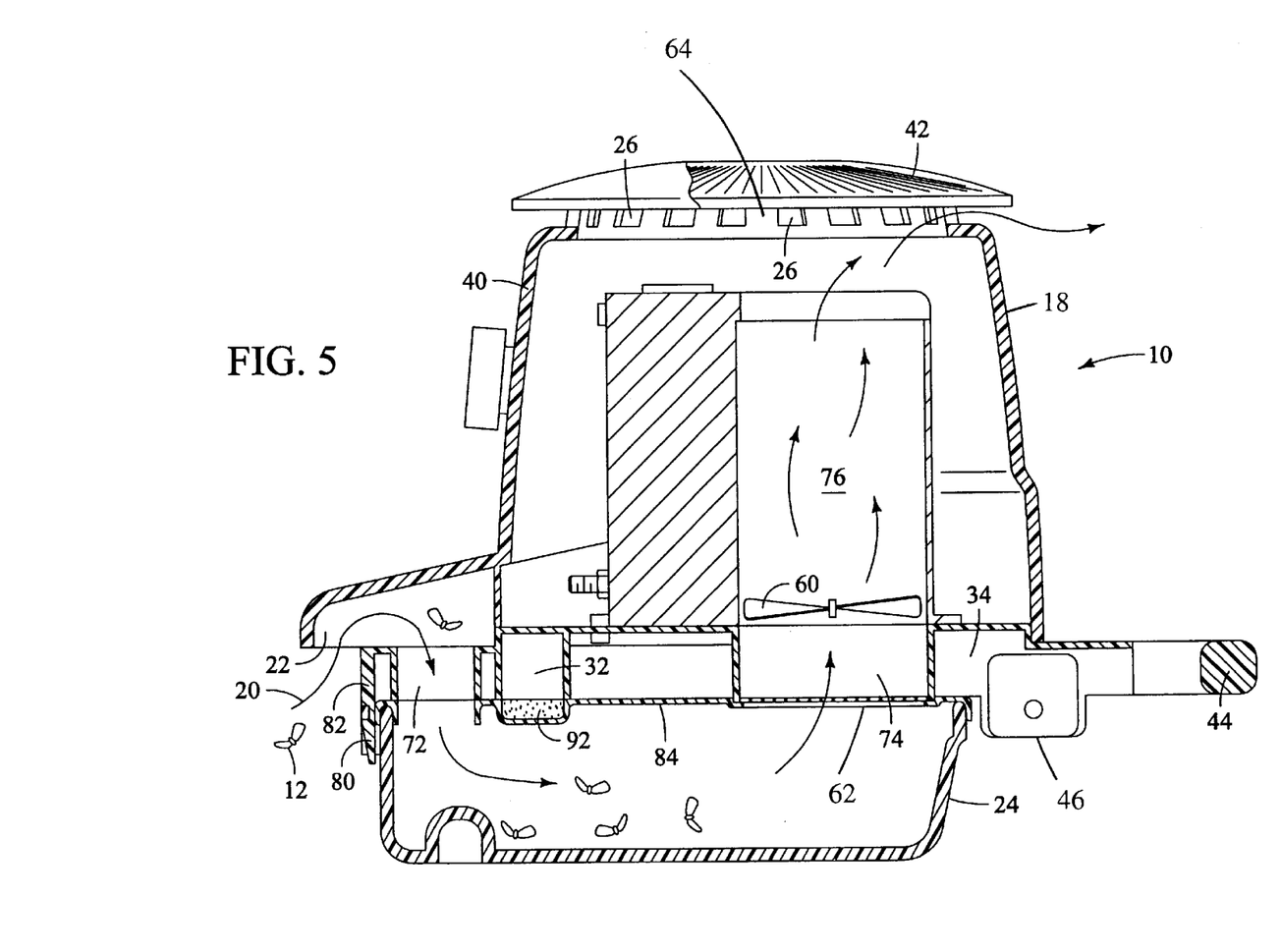
FIG. 5 is a cross-section taken along line 5—5 of FIG. 3 as viewed from the direction generally indicated.
Figure 6:
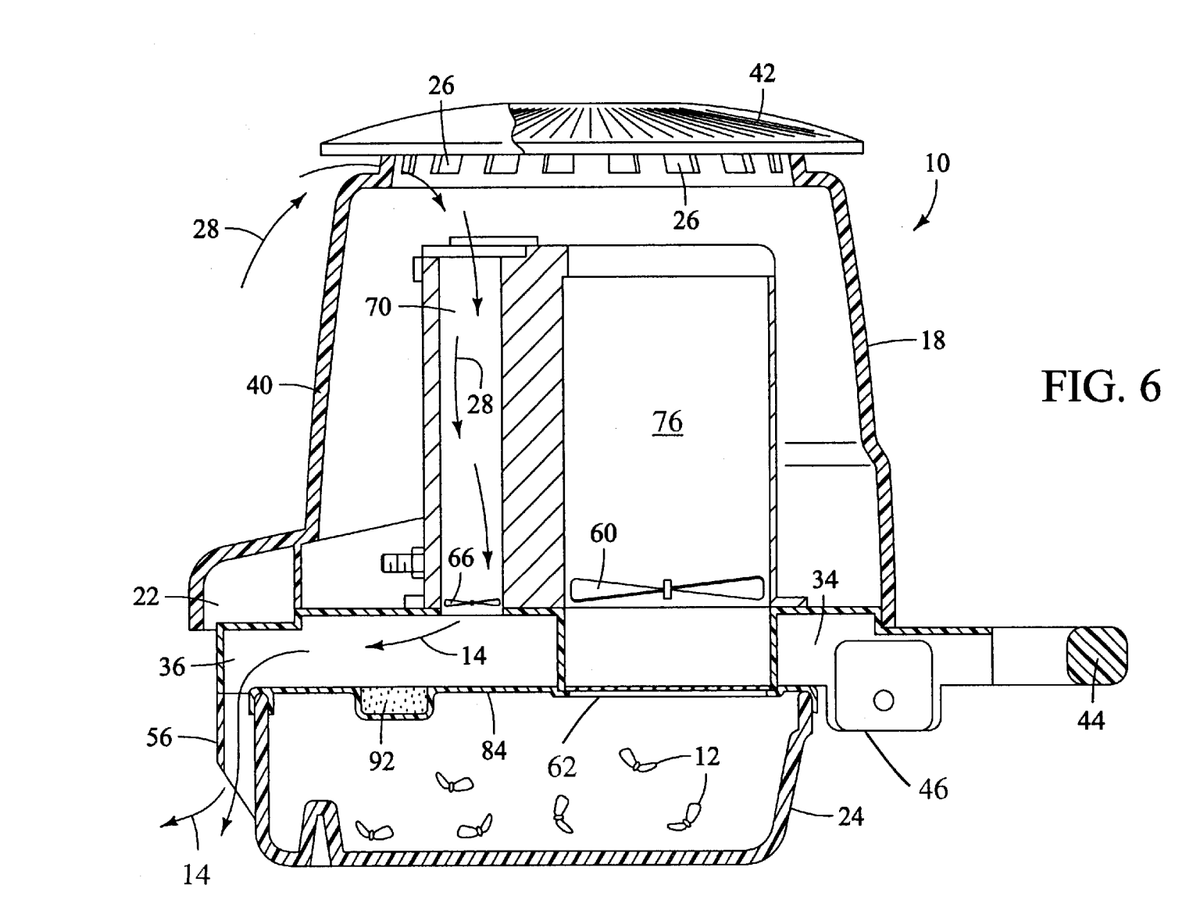
FIG. 6 is a cross-section taken along line 6—6 of FIG. 4 as viewed from the direction generally indicated.

Referring to FIGS. 5 and 6, insects 12 are attracted by a trail of exhaust gas 14 that exits the trap 10. As the insects 12 follow the exhaust gas trail 14 back to its source, they approach a trap housing 18 and are swept up into the trap by suction of an inlet air stream 20. The air stream 20 enters the trap 10 at an inlet 22, and passes through a trap cup 24 before exiting the trap through one or more suction outlets or vents 26. Air supply 28 to a $CO_2$ gas source 30 (FIG. 3) is drawn in through the vents 26. As it is emitted from the $CO_2$ gas source 30, $CO_2$ is deposited into the air supply 28 to form the exhaust gas 14. The exhaust gas 14 then passes through exhaust ducts 32 (FIG. 5) under a base 34 to one or more outlets 36. As it flows from the outlet 36, the exhaust gas 14 forms the trail that attracts insects 12 to the trap 10.

The trap housing 18 is made from any material suitable for use outdoors. Plastic is a preferred housing 18 material, particularly those plastic formulations that have above-average tolerance for solar radiation. Other preferred characteristics of the housing material are that it is lightweight so that the trap 10 is easily moved, and that it is easily molded for ease of manufacture. Stainless steel and other rust-resistant metals are also useful.

The housing 18 includes at least the base 34, the trap cup 24, an engine cover 40 and a shield 42. All parts are preferably molded plastic and in the preferred embodiment, designed to require less than about 8 molded parts. However, it is contemplated that the number of housing parts may vary to suit the application. As is known in the art, pieces of the housing 18 preferably fit together with a snap fit or a friction fit and reduce the use of fasteners. The base 34 is the main component of the housing 18 from the perspective that the $CO_2$ gas source 30 mounts to the base, and the cover 40 and trap cup 24 are then fitted to the base. An optional handle 44 is preferably molded into the base 34 to simplify moving the trap 10.

Figure 4:
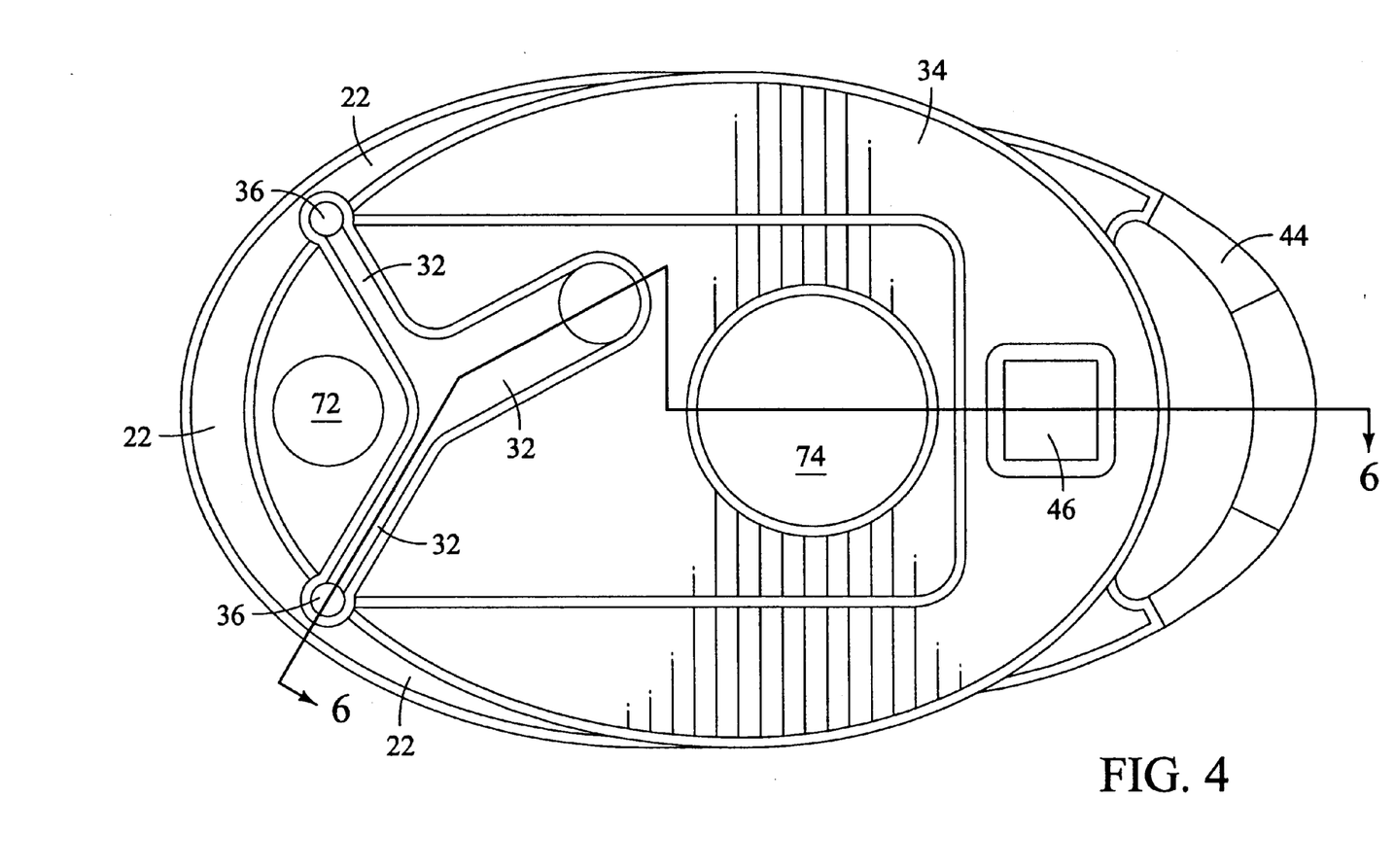
FIG. 4 is a bottom plan view thereof with the trap cup, trap cup cover and screen removed.

Preferably, the base 34 also has a universal pole mount 46 for use in mounting the trap 10 to a stand 50, which in the preferred embodiment is a cart with a pole 52, as shown in FIGS. 1 and 4. The universal pole mount 46 is a square indentation in the bottom of the base 34 designed to accept a round or square pole 52. One embodiment of the stand 50 (FIG. 1) provides an area for a fuel source 54 such as an LP tank, to rest below the trap 10.

Referring now to FIGS. 5 and 6, the at least one inlet 22 in the housing 18 provides for the inflow of the inlet air stream 20 and insects. The inlet 22 is optionally formed as part of the cover 40. In a preferred embodiment, there is one inlet 22 as shown in FIG. 4, however, a variety of suitable arrangements of inlets is possible within the context of this invention. The inlet 22 is sized and oriented to allow sufficient inlet air stream 20 to pull insects 12 from the exhaust gas trail 14 into the trap 10. When viewed from above, and when the trap 10 is oriented as in FIG. 1, the inlet 22 is preferably arcuate in shape, like a visor. In this shape, the inlet 22 can draw insects 12 from any of the one or more outlets 36. The inlet 22 is sufficiently near the outlet 36 so that insects 12 that follow the exhaust gas trail 14 are pulled into the trap 10 by the suction at the inlet.

The one or more outlets 36 are configured and arranged to emit the trail 14 of exhaust gases in such a manner to attract insects 12 to the inlet 22. In one embodiment, the outlet 36 is molded as part of the base 34, directing the exhaust 14 downwardly and parallel to the housing 14 for the length of the outlet 36. The outlet 36 is optionally lengthened by an outlet extension 56 on the trap cup 24. Preferably the outlet 36 is of a shape that is moldable, but any shape is suitable that permits flow of sufficient exhaust 14 to attract insects 12. Best seen in FIG. 2, the outlet 36 is downwardly vertically displaced from the inlet 22, and when multiple outlets are used, they are placed in a laterally displaced orientation from each other.

Referring to FIG. 5, at least one source of suction 60, such as a first or suction fan, is located within the housing 18. The suction fan 60 is in fluid communication with the one or more inlets 22, and draws the inlet air stream 20 and entrained insects 12 through the inlet. Preferably the suction fan 60 is located just above and is mounted to the base 34, however, other mounting and positioning arrangements are contemplated. Air is drawn from the trap cup 24 through a screen 62, creating a vacuum at the inlet 22. Upstream of the suction fan 60, the air moves through a suction chamber 76 toward the shield 42. The shield 42 reduces the amount of rain that enters the housing 18 and is mounted above and vertically displaced from the housing by one or more standoffs 64 creating a number of vents 26 at the top of the trap 10. The inlet air stream 20 leaves the trap 10 through the vents 26. The exact arrangement of the inlet 22 and the outlet 36 and their proximity to each other will be determined by the amount of suction power of the fan 60 and the aesthetic design of the trap housing 18. Preferably, the trap 10 also has a second or exhaust fan 66 (FIG. 6) to promote movement of exhaust gas 14 through the outlet 36. The suction fan 60, the exhaust fan 66 or both are optionally variable speed fans.

Figure 3:
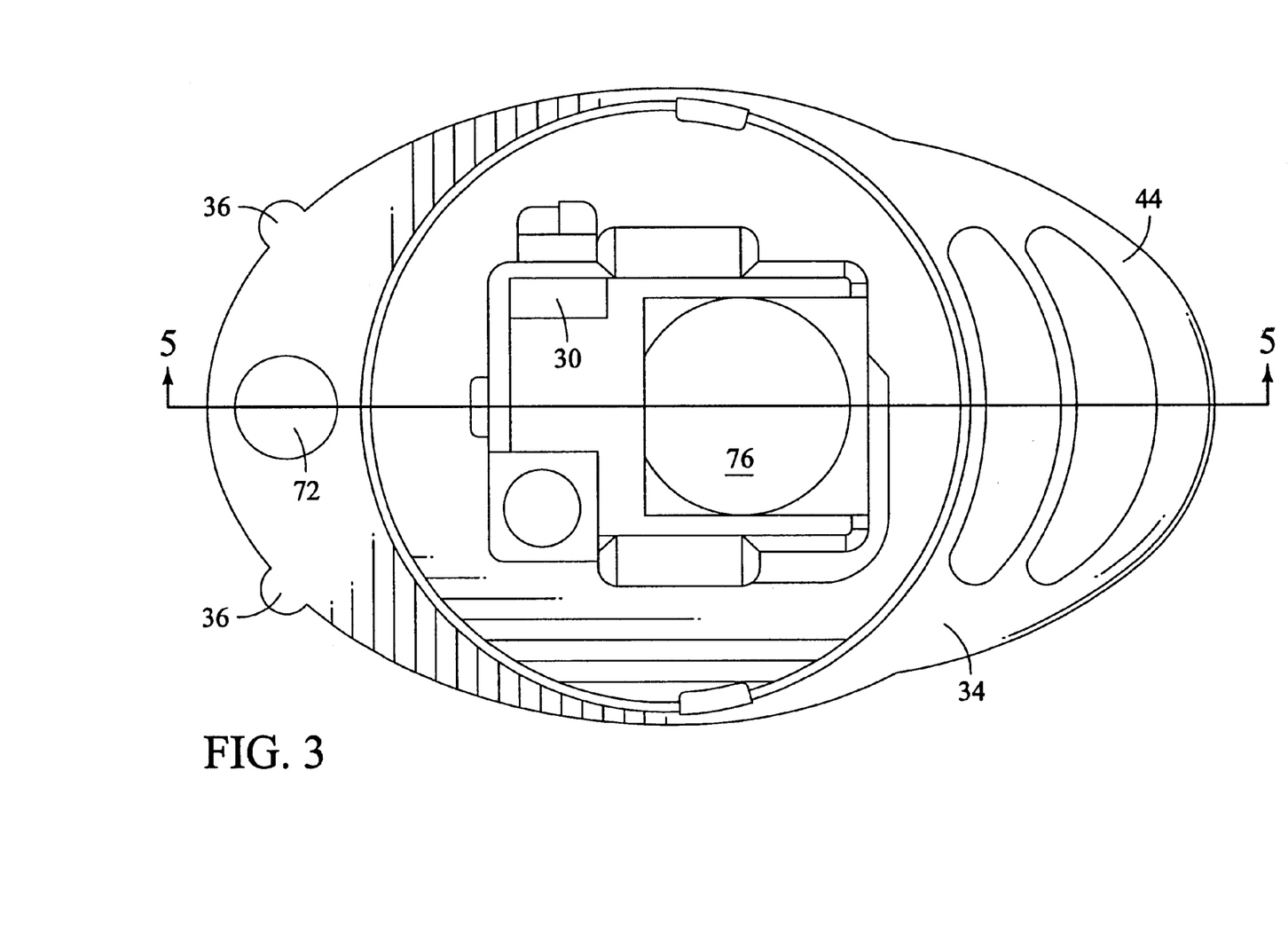
FIG. 3 is a top plan view thereof with the cover removed.

The trap 10 also includes the $CO_2$ gas source 30 disposed in the housing 14, as shown in FIG. 3. In one embodiment, the $CO_2$ gas source 30 is a combustion chamber with a chamber outlet. Carbon dioxide is generated from the combustion of fuel and oxygen in the combustion chamber 30. When the fuel is efficiently burned, water vapor, $CO_2$ and heat are produced by combustion. These combustion products are all known to attract insects 12 by mimicking the warmth, sweat and breath of warm-blooded animals. The combustion chamber 30 suitable for use outdoors is well known to an artisan in this field. Fuel from a fuel source 54 (FIG. 1) and oxygen from the air supply 28 are burned in the combustion chamber 30 to produce heat, carbon dioxide and water vapor. The preferred fuel is propane gas, however, other fuels, including but not limited to methane, butane or white gas can be used. In addition to supplying combustion products for attracting insects 12, the combustion chamber 30 of the preferred embodiment also supplies heat to one or more thermoelectric modules (not shown). Exemplary combustion chambers 30 are taught in U.S. Pat. Nos. 3,627,588 and 4,767,467, herein incorporated by reference. The thermoelectric module provides electrical power for the fan, eliminating the need for an external electric power source. Optionally, the unit has a piezoelectric igniter to initiate combustion.

Use of the combustion chamber 30 with the thermoelectric modules is a preferred embodiment for a unit that can be used in any outdoor setting without regard to the availability of electricity. However, it is contemplated that the air flow pattern of this invention is useful in an insect trap 10 that is electrically powered or is a hybrid unit. Hybrid traps generate carbon dioxide, steam and heat in the combustion chamber 30, but other electrical devices, such as fans and lights, are operated using supplied electrical current. Electrically-operated traps use insect attractants that are supplied or generated using electricity.

Referring now to FIG. 6, supply air 28 is drawn into an air supply chamber 70 from the vents 26. As the supply air 28 passes the combustion chamber 30, combustion products flow into the supply air, creating the exhaust gas stream 14 from a mixture of the supply air and the combustion products. The optional exhaust fan 66 is used to push the exhaust gas 14 through one or more trap outlets. Although the combustion chamber 30 is a preferred $CO_2$ gas source, this flow pattern is useful with any $CO_2$ gas source.

Turning to FIGS. 4, 5 and 6, an exhaust system is connected to the $CO_2$ gas source for directing a flow of $CO_2$ from the gas source to the at least one outlet. The exhaust system includes the air supply chamber 70 that carries supply air to the combustion chamber 30 and one or more exhaust ducts 32 that carry the exhaust gas 14 from the combustion chamber to the outlet 36. If more than one outlet 36 is present, the exhaust gas 14 stream is divided and a portion is directed to each of the outlets by the exhaust duct 32. Flow of the exhaust gas 14 is directed around an inlet opening 72 in the base 34 through which the inlet air stream 20 passes to reach the trap cup 24. Preferably, the exhaust ducts 32 are molded into the base 34 at the time of manufacture, however the use of tubing or other exhaust ducts 32 is also contemplated.

Figure 7:
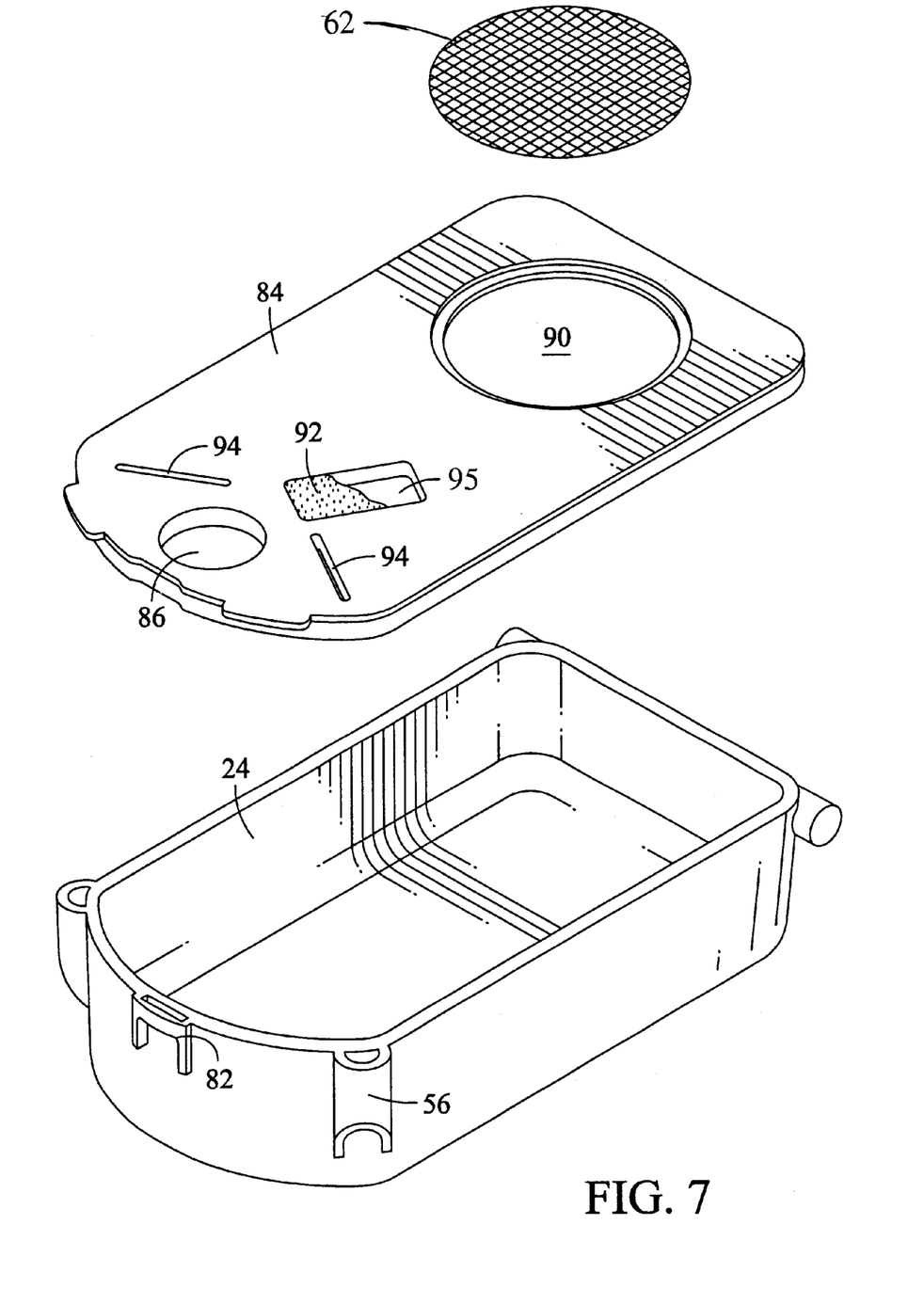
FIG. 7 is an exploded perspective view of the trap cup and trap cup cover.

Insects 12 entrained in the inlet air stream 20 are held in the trap 10 in the trap cup 24, best seen in FIGS. 5 and 7. The trap cup 24 is removably attached to the base 34 and disposed between the inlet 22 and the suction fan 60. As mentioned above, the trap cup 24 at least partially defines the flow path of the inlet air stream 20. The inlet air stream 20 air follows a serpentine path, flowing up the inlet 22, then turning downwardly through the inlet opening 72 in the base 34 and into the trap cup 24. Air flows through the length of the cup 24 before turning upwardly through a suction opening 74 in the base 34, such flow being drawn by rotation of the suction fan 60. The suction fan 60 then pushes the air upwardly through the suction outlet chamber 76 before exiting the apparatus 10, through the vents 26 between the shield 42 and the cover 40. Without the trap cup 24 in place, there is no flow path between the inlet opening 72 and the suction opening 74, and the suction fan 60 would be ineffective. The trap cup 24 is configured to provide a substantially closed flow path for the suction air. Insects 12 entering the trap 24 with the inlet air stream 20 follow the same serpentine path into the trap cup 24, where the screen 62 traps them prior to entering the suction fan 60.

By attaching the trap cup 24 to the base 34 using a friction fit, the cup is freely accessible from the outside of the trap 10, without the need to remove the cover 40 to empty the unit of insects 12. The screen 62 between the trap cup 24 and the suction fan 60 holds the insects 12 in the cup for easy disposal. Preferably, the trap cup 24 is held by a snap fit to the base 34, and is easily attached and removed. A latch 80 molded to the base 34 fits a corresponding lock 82 on the trap cup 24. Pushing inwardly on the latch 80 disengages it from the lock 82 for removal of the trap cup 24, while inserting the latch until the lock engages holds the cup securely in place.

In the preferred embodiment, the trap cup 24 has a trap cup cover 84 that functions as part of the air flow system when the exhaust ducts 32 in the base 34 are molded as open channels. If the open trap cup 24 were attached to the base 34 without the trap cup cover 84, the exhaust gas 14 would mix with the inlet air stream 20 in the trap cup. The trap cup cover 84 acts to close the exhaust ducts 32 from the trap cup 24 and separate the exhaust gas 14 from the fresh inlet air stream 20. Optionally, canals (not shown) in the trap cup cover 84 add volume to the exhaust ducts 32. A cover inlet 86 to the trap cup cover 84 aligns with the inlet opening 72 in the base 34 to permit the inlet air stream 20 to enter the trap cup 24. Similarly, there is a cover outlet 90 that aligns with the suction opening 74 through which the suction fan 60 draws air out of the trap cup 24.

Still referring to FIG. 7, in addition to the $CO_2$, heat and water vapor generated by the combustion chamber 30, insect attractants 92 are useful for attracting a larger number or variety of insects 12. Any type of attractant 92 can be used, including but not limited to light, color, heat and chemical attractants. Chemical attractants 92 include octanol, citronella and the like. In one embodiment, one or more receptacles 94 for supplemental chemical insect attractants 92, such as octanol, are optionally molded into the trap cup cover, the exhaust ducts 32 or another portion of the housing 18 where a portion of the supplemental attractant becomes part of the exhaust gas stream prior to leaving the outlet. Chemical insect attractants 92 are available in a number of forms, sizes and strengths. Preferably, the insect trap 10 has one or more of the receptacles 94 that are able to accept a variety of attractants 92, such as slots or trays in the trap cup cover 84. Depressed slots 94 in the trap cup cover 84 are a convenient way of accommodating laminate-type attractants 92. A recessed tray 95 is useful to hold liquid or gel-type chemical attractants 92.

Figure 2:
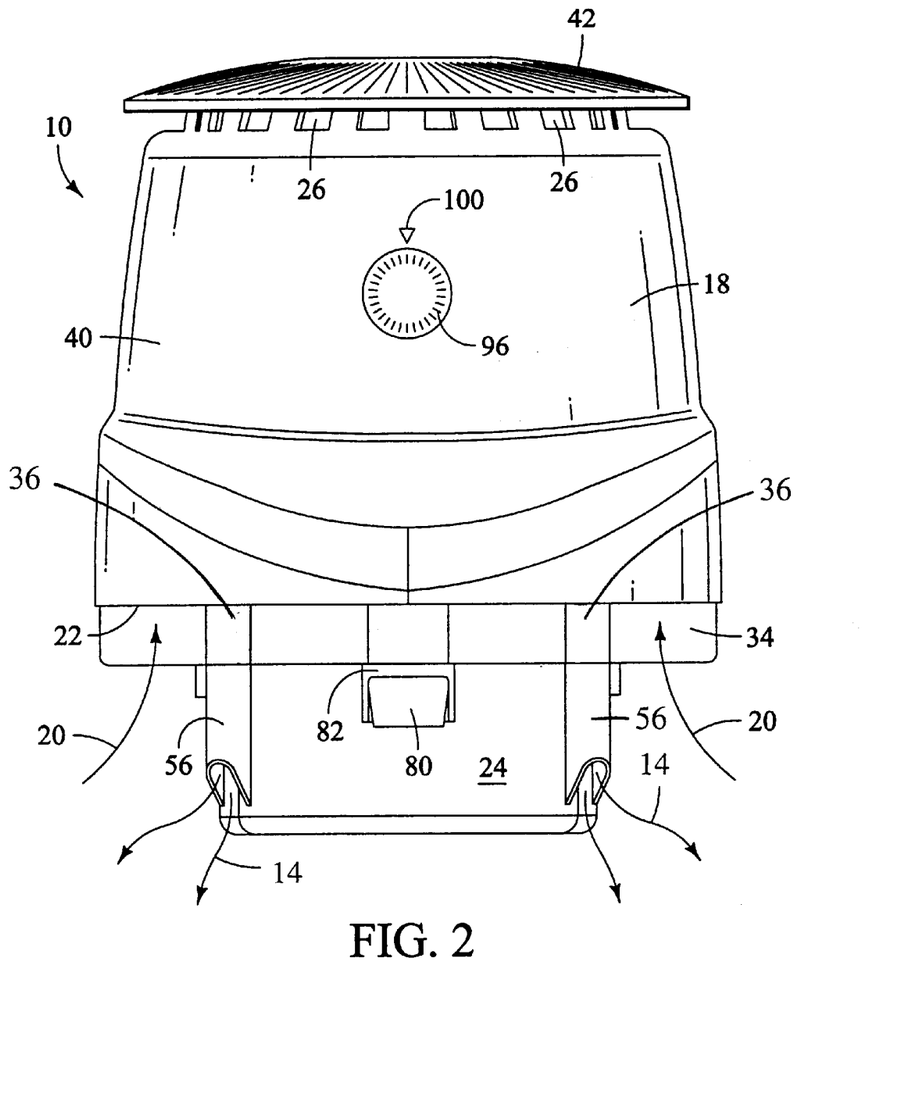
FIG. 2 is a front plan view of the trap.

As seen in FIG. 2, another useful feature is the addition of a scale 96 and an indicator 100 that move in relation to each other, to be used as a reminder as to when the fuel needs to be replaced. If propane is used as the fuel source 54, it is commonly supplied in 20 lb. tanks. Since there is no gauge on the tank to show when the fuel is low, it is convenient to have a device on the housing 18 to aid the user in judging when to replace the fuel source 54.

In one embodiment, the scale 96 is in the form of a series of numerals from 1 to 31 located on a dial and the indicator 100 is a marking on the surface of the housing 18. Based upon experience or the manufacturer's recommendation, the user can estimate when the fuel source 54 next needs to be replaced. The scale 96 can then be turned so that the indicator 100 aligns with the numeral representing the date upon which the fuel tank source 54 should be changed. In the alternative, the indicator 100 can be used as a reminder of the date on which the fuel source 54 was last changed. The user need only look to the indicator 100 and scale 96 to be able to determine when to change the fuel source 54.

In operation, insects 12 are attracted to the trap 10 by the path of the exhaust gas 14 that includes several attractants, such as heat, water vapor, $CO_2$ and other attractants 92. As it follows the trail 14 and approaches the trap 10, the insect 12 is swept up into the inlet 22 with the inlet air steam 20 due to suction created by a suction fan 60 within the housing 18. The suction fan 60 pulls air through the inlet 22 and along a serpentine route through the inlet opening 72 in the base 34, through the trap cup 24, through the suction opening 74 in the base 34 to the suction fan 60, then is blown out the suction outlet chamber 76 and exits the apparatus through vents 26. Insects caught in the air stream 20 become trapped in the trap cup 24. Supply air is drawn in the vents 26 and down the air supply chamber 70 to the combustion chamber 30. Oxygen-containing air is taken into the combustion chamber 30, while combustion by-products, including $CO_2$, water vapor and heat, are discarded into the inlet air stream 20, creating the exhaust gas 14. The exhaust gas 14 then travels through exhaust ducts 32 to the outlets 36, where it exits to the surrounding air, creating the exhaust gas trail 14.

While a particular embodiment of the present insect trap has been shown and described, it will be appreciated by those skilled in the art that changes and modifications may be made thereto without departing from the invention in its broader aspects and as set forth in the following claims.

What is claimed is:

1. An insect trap apparatus, comprising:
   a trap housing having at least one inlet and at least one outlet;
   a source of suction located within said housing, and being in fluid communication with said at least one inlet for drawing insects through said inlet;
   a $CO_2$ gas source disposed in said housing;
   an exhaust system connected to said $CO_2$ gas source for directing a flow of $CO_2$ from said gas source to said at least one outlet; and
   at least one trap cup connected to said housing and disposed between said inlet and said source of suction.

2. The apparatus of claim 1 wherein said at least one trap cup is constructed and arranged to at least partially define an insect flow path between said inlet and said suction source.

3. The apparatus of claim 1 wherein said at least one trap cup is releasably connectable to said housing.

4. The apparatus of claim 3 wherein said housing has a lower end defining an opening, and said trap cup is configured to at least substantially close said opening.

5. The apparatus of claim 1 wherein said inlet is configured for defining a serpentine path for an inflow of insects into said trap cup.

6. The apparatus of claim 1 further including a suction outlet for said source of suction disposed substantially opposite said trap cup on said housing.

7. The apparatus of claim 6 wherein said trap cup is connected to a lower end of said housing, and said suction outlet is located at an upper end of said housing.

8. The apparatus of claim 6 further including a shield for said suction outlet.

9. The apparatus of claim 6 wherein said $CO_2$ gas source is a combustion chamber.

10. The apparatus of claim 1 wherein said at least one inlet is provided as a single opening and a pair of said outlets are provided in laterally displaced orientation.

11. The apparatus of claim 10 wherein said outlets are vertically displaced from said inlet.

12. The apparatus of claim 10 wherein said inlet is arcuate when viewed from above.

13. The apparatus of claim 1 wherein said housing includes receptacles in fluid communication with said at least one outlet which are configured for receiving supplemental insect attractant.

14. The apparatus of claim 1 further comprising one or more exhaust ducts and wherein said $CO_2$ is directed to said outlet through said exhaust ducts.

15. The apparatus of claim 14 further comprising a base from which said trap cup depends and upon which said $CO_2$ source and said source of suction are mounted.

16. The apparatus of claim 15 wherein said exhaust ducts are integral with said base.

17. The apparatus of claim 15 further comprising a trap cup cover disposed between said base and said trap cup.

18. The apparatus of claim 17 further comprising receptacles in fluid communication with said at least one outlet which are configured for receiving supplemental insect attractant, said receptacles being disposed in said trap cover.

19. An insect trap apparatus, comprising:
   a trap housing having at least one inlet and at least one outlet;
   a source of suction located within said housing, and being in fluid communication with said at least one inlet for drawing insects through said inlet;
   a trap cup attached to said housing;
   a suction outlet for said source of suction disposed substantially opposite said trap cup on said housing;
   a shield associated with said housing covering said suction outlet;
   a $CO_2$ gas source disposed in said housing; and
   an exhaust system connected to said $CO_2$ gas source for directing a flow of $CO_2$ from said gas source to said at least one outlet.

20. The apparatus of claim 19 wherein said trap cup is disposed between said inlet and said source of suction.

* * * * *